United States Patent
Salamon et al.

(10) Patent No.: US 7,418,209 B2
(45) Date of Patent: Aug. 26, 2008

(54) SYSTEM AND METHOD FOR MULTI-DIMENSIONAL ENCODING

(75) Inventors: Aviv Salamon, Washington, DC (US); Nadejda Reingand, Baltimore, MD (US); Isaac Shpantzer, Bethesda, MD (US); Michael Tseytlin, Bethesda, MD (US)

(73) Assignee: CeLight, Inc., Silver Spring, MD (US)

( * ) Notice: Subject to any disclaimer, the term of this patent is extended or adjusted under 35 U.S.C. 154(b) by 702 days.

(21) Appl. No.: 10/462,834

(22) Filed: Jun. 17, 2003

(65) Prior Publication Data

US 2004/0146269 A1 Jul. 29, 2004

Related U.S. Application Data

(63) Continuation-in-part of application No. 10/173,581, filed on Jun. 18, 2002, now Pat. No. 6,671,425.

(51) Int. Cl.
*H04B 10/04* (2006.01)
*H04B 10/12* (2006.01)
*H04B 10/06* (2006.01)
*H04K 1/00* (2006.01)

(52) U.S. Cl. ............ 398/185; 396/182; 396/154; 396/203; 380/256

(58) Field of Classification Search ......... 398/183–191, 398/154, 203; 380/255, 256
See application file for complete search history.

(56) References Cited

U.S. PATENT DOCUMENTS

| | | | |
|---|---|---|---|
| 6,381,053 B1 * | 4/2002 | Fathallah et al. | 398/99 |
| 6,396,801 B1 * | 5/2002 | Upton et al. | 370/204 |
| 6,405,261 B1 * | 6/2002 | Gaucher | 709/250 |
| 6,839,521 B2 * | 1/2005 | Davis | 398/156 |
| 2003/0058504 A1 * | 3/2003 | Cho et al. | 359/161 |
| 2003/0103771 A1 * | 6/2003 | Atmur et al. | 398/152 |
| 2004/0062549 A1 * | 4/2004 | Obeda et al. | 398/30 |
| 2005/0025256 A1 * | 2/2005 | Van De Beek et al. | 375/308 |

OTHER PUBLICATIONS

Introduction To DWDM Technology; S. V. Kartalopoulos; IEEE Press, 2000, pp. 161-162.*
Experimental demonstration of the (de)coding of hybrid phase and frequency codes using a pseudolocal oscillator for optical code division multiplexing; Andonovic et al.; Photonics Technology Letters, IEEE; vol. 10, Issue 6, Jun. 1998; pp. 887-889.*

* cited by examiner

*Primary Examiner*—Shi K. Li
*Assistant Examiner*—Nathan Curs

(57) ABSTRACT

The invention provides, according to its various embodiments, a method for secure communication that involves encoding and transmitting an optical communications signal that is encoded based on a multi-dimensional encoding technique. The multi-dimensional encoding technique includes multiple security layers and varies multiple physical characteristics of a communications signal. The multi-dimensional encoding technique may include at least one or more of encoding a phase of an optical communications signal, encoding a polarization of an optical communications signal, and encoding a frequency of an optical communications signal, or any combination thereof. According to embodiments of the invention, the encoding and/or any decoding of the optical communications signal may be carried out using one or more of an optical phase shift coding, a polarization multiplexing, and a multi-wavelength control. Multi-dimensional encoding and decoding keys are provided.

18 Claims, 8 Drawing Sheets

SYSTEM AND METHOD FOR MULTI-DIMENSIONAL ENCODING

PRIORITY INFORMATION

This application is a continuation-in-part of and claims priority of U.S. Application No. 10/173,581, entitled "Method and System for Acoustically Tuning a Light Source," filed on Jun. 18, 2002 issued as U.S. Pat. No. 6,671,425, the disclosure of which is incorporated by reference in its entirety.

RELATED APPLICATION

This application is related to U.S. Application No. 10/173,579, entitled "Light Source For Generating Output Signal Having Evenly Spaced Apart Frequencies," filed on Jun. 18, 2002 issued as U.S. Pat. No. 7315697 the disclosure of which is incorporated herein by reference in its entirety.

FIELD OF THE INVENTION

The invention relates to a system and method for multi-dimensional encoding techniques. More specifically, the invention relates to multi-dimensional encoding of optical communication signals, for example, for security reasons.

BACKGROUND

Optical communications are usually either free-space systems, or systems using waveguides, such as optical fibers or the like. Typically, when the security of information being communicated by way of an optical communications system is of high importance, one or more security layers may be added to the communications signal to protect the integrity and authenticity of the data. For example, data encryption and user authentication are two security layers commonly used in today's communications networks. Data encryption techniques are often used to encode a data stream (e.g., a data stream transmitted by way of a communications signal), preventing users who do not have the proper decryption algorithm or from decoding the encoded information transmitted by way of the communications network.

User authentication, on the other hand, involves procedures and/or technologies that are implemented to prevent unauthorized users from gaining access to confidential data. Although both of these techniques help maintain the integrity and authenticity of data transmitted by way of optical communications networks, they both have problems, and may not be sufficient for use in systems where the integrity, confidentiality, and/or authenticity of the data being communicated is of the utmost importance.

For example, standard data encryption algorithms can be broken by powerful computers or advanced computer algorithms. A user employing such resources could intercept encoded communications signals, record the signals, and later decode the signals. As these resources become more readily available and more powerful, the threat to maintaining the integrity and confidentiality of encoded communications signals increases.

Additionally, although user authentication procedures are often sufficient to ensure that sensitive data is secured at a receiving end of a communications link, they generally do not prevent a hostile user from intercepting communication signals while they are being transmitted. Such unauthorized interceptions of communication signals are difficult to detect, and can be accomplished by way of standard equipment that is readily available, either commercially or otherwise, to would-be data interceptors.

Accordingly, it would be desirable to provide one or more additional security layers that allow for additional security of communications signals being transmitted in a communications system or network. Specifically, it would be desirable to provide additional encryption to information being communicated by way of optical communications systems, which provides security layers that exceed the security of standard data encryption and user authentication.

SUMMARY

An optical communications system with coherent detection in which the signal is encoded based on a multi-dimensional encoding technique is disclosed. The multi-dimensional encoding technique includes multiple security layers and modifies multiple physical characteristics of a communications signal. The multi-dimensional encoding technique may include at least one of the following: encoding the phase of an optical communications signal, encoding the polarization of an optical communications signal, and encoding the frequency of a optical communications signal, or any combination thereof. The optical signal is modulated by data using phase shift keying or amplitude modulation. The information is decoded using homodyne or heterodyne detection.

The multi-dimensional encoding technique described herein improves upon prior approaches, which it may incorporate as a single dimension of a multi-dimensional encoding technique. For example, U.S. Application No. 10/173581, issued as U.S. Pat. No. 6671425 incorporated by reference above, provides secure optical communications by varying the frequency of a communications signal (e.g., light encoding transmitted information) as a function of time using phase shift keying or amplitude modulation, which can be decoded using homodyne or heterodyne detection. Any of the encoding techniques of U.S. Application No. 10/173581, issued as U.S. Pat. No. 6671425 may form a part of the multi-dimensional encoding technique of described herein.

BRIEF DESCRIPTION OF THE DRAWINGS

The invention is discussed below in reference to the drawings in which like parts are indicated by like reference designators.

DETAILED DESCRIPTION

To facilitate an understanding of the principles and features of the invention, it is explained hereinafter with reference to its implementation within illustrative embodiments. In particular, the invention is described in the context of an optical communications system, where a data stream transmitted on a coherent optical carrier signal is encoded using a multi-dimensional encoding technique.

The invention, however, is not limited to its use within the optical communications embodiments described herein. Rather, the invention can be used in any context in which a multi-dimensional encoding can find utility.

According to embodiments of the invention, a system and method for multi-dimensional encoding of a communications signal is disclosed. Specifically, in addition to the data encryption and user authentication security layers, additional security layers are provided by way of multi-dimensional encoding techniques including modification of multiple physical characteristics of the communications signal. Generally speaking, these encoding techniques are accomplished in an optical communications system that uses coherent detection of communications signals. For example, according to various embodiments of the invention, lasers are used as a communications signal source, and provide a signal to be encoded by way of one or more of multi-dimensional encoding techniques. According to various embodiments of the invention, the multi-dimensional encoding techniques may provide additional encoding, or added security, using, for example, one or more of the following techniques: optical phase shift coding, polarization multiplexing, and dynamic multi-wavelength control. Additionally, other parameters and/or techniques may be combined with the techniques mentioned above to provide additional security in multi-dimensional encoding of optical communications signals.

The term multi-dimensional encoding, as used herein, is an encoding technique that modifies multiple physical characteristics of a communications signal. According to embodiments of the invention, multi-dimensional encoding modifies two or more physical characteristics of a communications signal, such as, for example a phase characteristic, a polarization characteristic, a frequency or wavelength characteristic, or other suitable characteristics.

Figure 1:
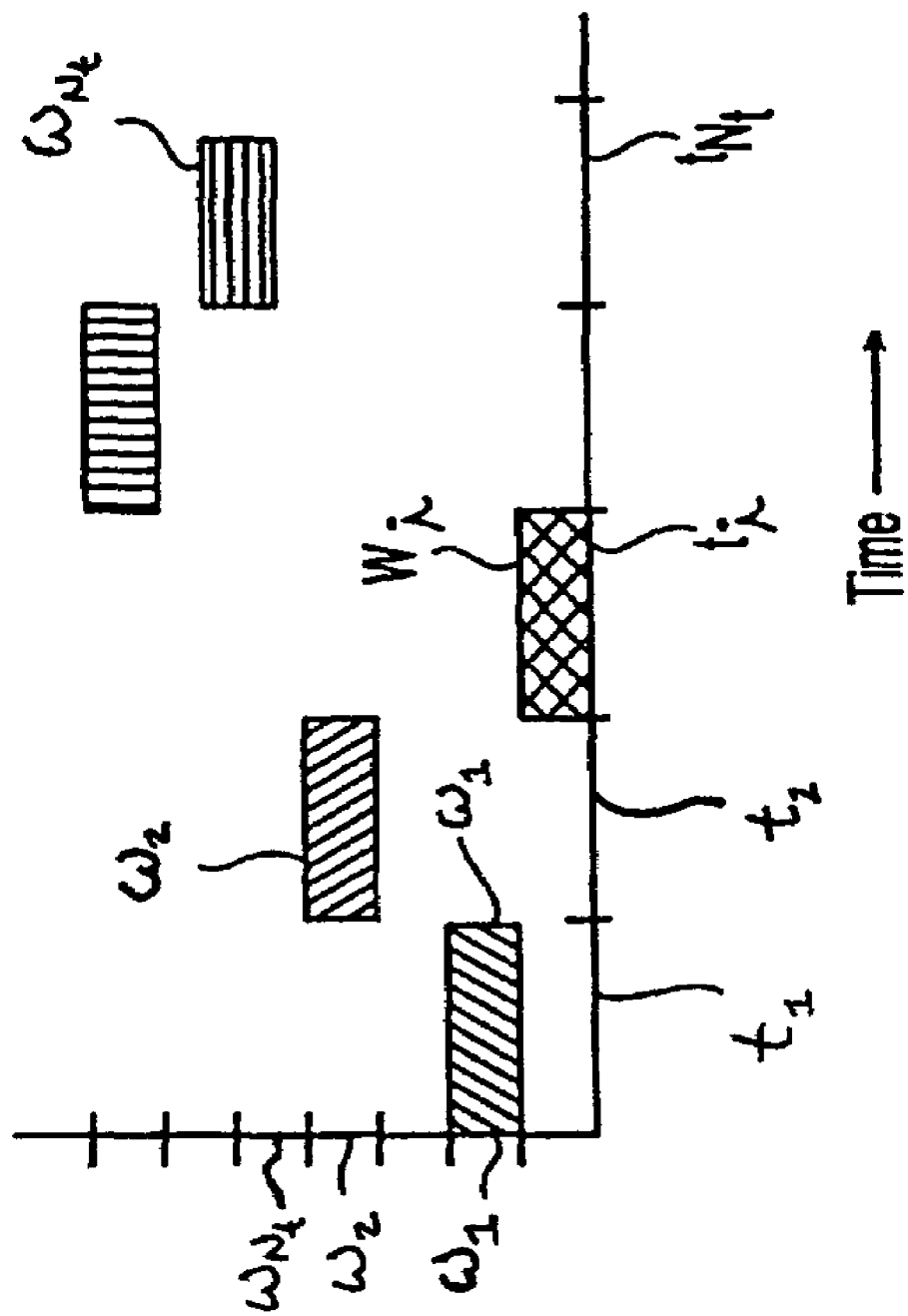
FIG. 1 illustrates a time-frequency plot of light output by a secure communication source.

Referring to FIG. 1, a method for secure optical communication is disclosed and includes varying, as a function of time, a frequency of light. The secure optical communication shown in FIG. 1 uses multi-wavelength control techniques. During a first time period $t_1$, information is encoded, such as by amplitude or, phase modulation, for example, of light having a carrier frequency $\omega_1$. During a second time period $t_2$, information is encoded by modulation of light having a carrier frequency $\omega_2$, which may be the same as or different from $\omega_1$. In general, information is encoded, during the ith time period $(t_i)$, by modulation of light of a carrier frequency $\omega_j$. The encoding step is repeated for a number $N_t$ times until all the information has been transmitted. At each successive time period, information may be encoded upon light having a frequency different from or the same as a frequency of light encoded upon during the previous time period. Thus, the information is encoded upon light having a number of frequencies $N_\omega$, which may be less than $N_t$. The length of the time periods may be the same or may vary from period to period. The encoded information is transmitted to a receiver.

Light encoded with the information is transmitted, such as through free space or via a fiber optic network to a receiver, where the information is decoded. Because the frequency of the transmitted light varies according to a specific pattern or sequence, one without knowledge of the transmission frequency sequence is prevented from decoding the transmitted information.

Figure 2:
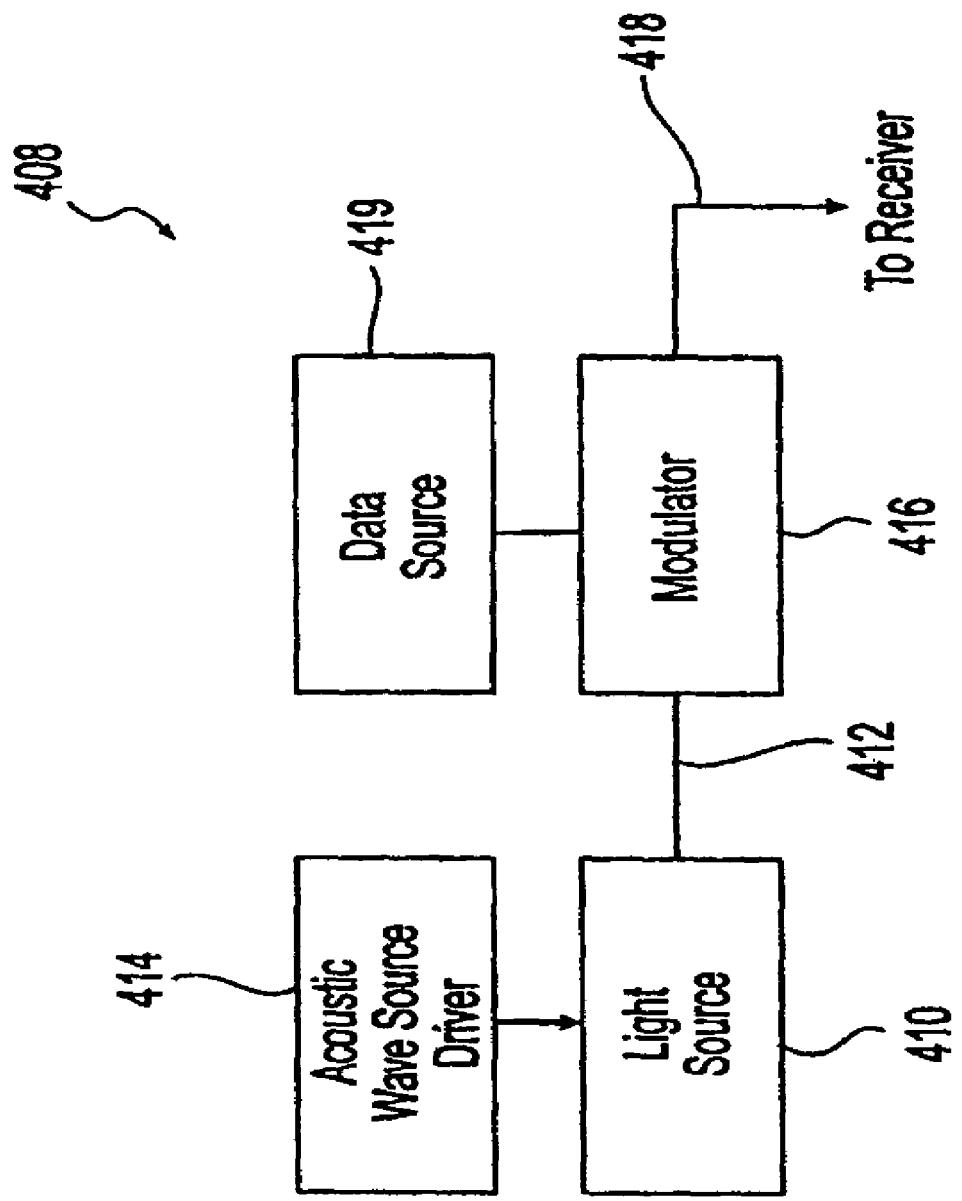
FIG. 2 illustrates a secure communication source of the invention suitable for preparing the time-frequency plot of FIG. 1.

Referring to FIG. 2, a transmitter 408 having a light source 410, which may be a light source, can be used to provide the light that is modulated to encode the information. An acoustic wave source driver 414 varies the frequency of an acoustic wave provided to a light source 410 to prepare an output beam 412 that switches between a plurality of frequencies as a function of time. Output beam 412 is received by a modulator 416, which modulates output beam 412 with information from a data source 419 to prepare a modulated output beam 418.

The modulator 416 is a phase modulator, which prepares an optical signal that encodes information by, for example, phase shift keying, binary phase shift keying or quaternary phase shift keying. During the ith time period, the phase modulator 416 modulates phase of light having a frequency $\omega_i$ of the output beam 412 to encode information from the data source 419. During the jth time period, where j=i+1, the phase modulator 416 modulates phase of light having a frequency that may be the same as or different from $\omega_i$. The modulated output beam 418 is transmitted by the transmitter 408 to be received and decoded by one having knowledge of the successive frequencies used to encode the information. The information may be decoded using, for example, homodyne or heterodyne detection.

Figure 3:
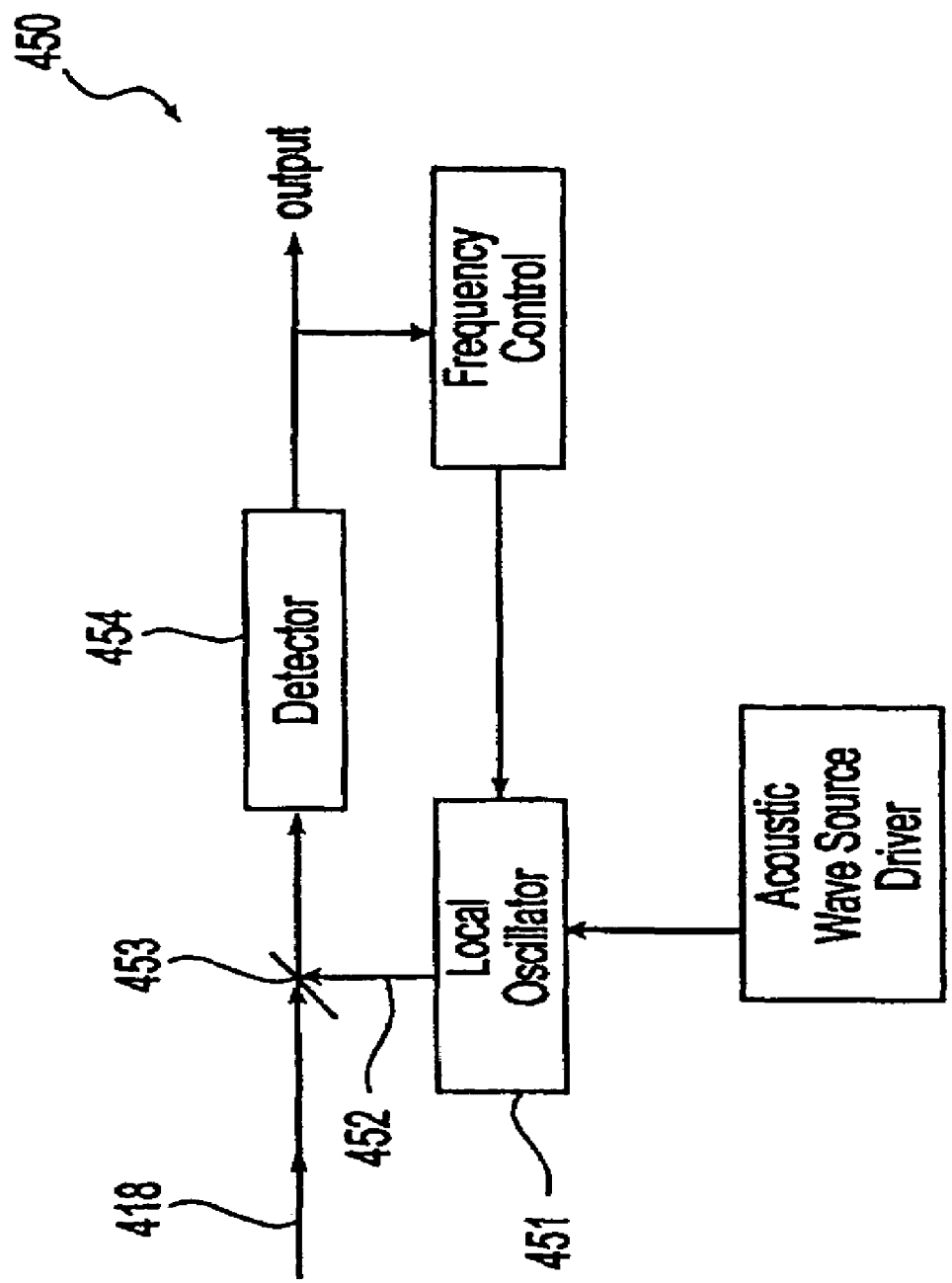
FIG. 3 illustrates a receiver of the invention for receiving information transmitted by the secure communication source of FIG. 2.

Referring to FIG. 3, a heterodyne receiver 450 includes a local oscillator 451 providing an oscillator beam 452 having a variable frequency corresponding to the variable frequency of the received output beam 418. The local oscillator 451 comprises any suitable light source. The oscillator beam 452 and the output beam 418 are combined by a combiner 453 and detected by an optical detector 454. Frequency mismatch between the beams 452 and 418 can be, for example, less than about 1 GHz, such as less than about 250 MHz.

It should be noted that the multi-wavelength control techniques discussed above in connection with FIG. 1 can form part of a multi-dimensional encoding technique, in accordance with various embodiments of the invention. For example, an encrypted communications signal can be transmitted using the multi-wavelength control technique discussed in connection with FIG. 1, which provides a part of the multi-dimensional encoding technique. Additionally, this multi-wavelength control technique can be used in connection with the manipulation of other physical characteristics of the communications signal. For example, whether or not the underlying communications signal is encrypted prior to application of multi-wavelength control technique, it can be further encoded by changing parameters in addition to than the multi-wavelength control exhibited in FIG. 1.

Several embodiments of the invention use coherent sources, which provide a coherent communications signal (e.g., laser, maser, etc.). The carrier frequency of the communications signal can be, for example, phase- or amplitude-modulated with data, according to various embodiments of the invention. For example, communications systems operating in the digital domain can transmit digital communications signals using phase-shift keying (PSK) or amplitude-shift keying (ASK) in place of frequency and amplitude modulation, respectively.

Figure 4:
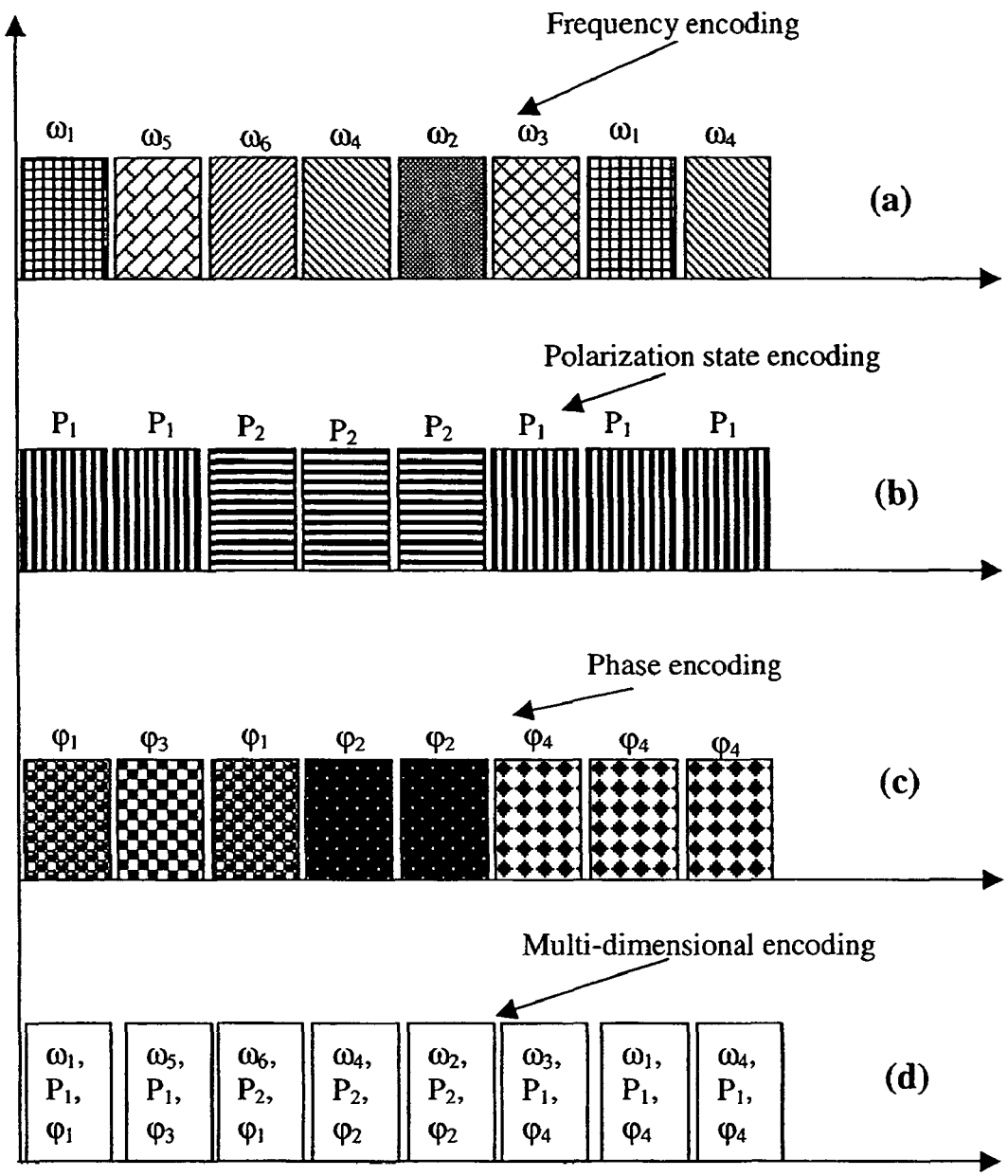
FIG. 4 illustrates a series of plots showing different exemplary encoding techniques used in the multi-dimensional encoding, according to one or more embodiments of the invention.

Various aspects of multi-dimensional encoding of a communications signal in one channel are illustrated in the examples shown in the various plots of FIG. 4. Each of the plots shown in FIG. 4 illustrates a different encoding technique, whereby a communications signal is varied over time (shown on the horizontal axis) and changed in each time slot. The time slots are represented in the plots of FIG. 4 by individual rectangles along the horizontal axis. In FIG. 4, Plot (a) illustrates varying frequencies of the transmitting light or carrier signal according to a pseudo-random pattern to achieve wavelength (or frequency) encoding. Plot (b) of FIG. 4 illustrates varying the polarization state of the transmitting light or carrier signal according to a pseudo-random pattern to achieve polarization encoding. Plot (c) represents varying the phase of transmitting light according to a pseudo-random pattern to achieve phase encoding. Plot (d) represents varying multiple components of the transmitting light or carrier signal according to one or more pseudo-random patterns to achieve multidimensional encoding in accordance with embodiments of the invention. In Plot (d) shown in FIG. 4, the multidimensional encoding includes simultaneously varying of each individual characteristic varied in Plots (a)-(c) according to a pseudo-random pattern. The encoding techniques of each of the plots shown in FIG. 4 are described in greater detail below.

Plot (a) of FIG. 4 illustrates varying frequencies of the transmitting light or carrier signal according to a pseudo-random pattern to achieve wavelength (or frequency) encoding. As shown in Plot (a), the carrier signal is varied between several frequencies $\omega_i$. Although six frequencies are shown in Plot (a), more or fewer frequencies can be used depending upon the desired results and/or design requirements of the system. The frequency of the carrier signal is varied according to a pseudo-random pattern, which is described in greater detail below, to achieve wavelength (or frequency) encoding. This encoding provides a certain level of security by itself, and can be used in multi-dimensional encoding techniques according to embodiments of the invention.

Polarization multiplexing (or polarization state encoding) can also be used to encode the carrier signal by changing the polarization states of the carrier signal according to a pseudo-random pattern, as shown in Plot (b) of FIG. 4. The polarization states of the carrier light of a communications signal can be varied independently. For example, in an optical system, the optical communications signal can be separated into two orthogonal polarizations (e.g., a vertical component and a horizontal component, or a clockwise component and a counter-clockwise component), each of which may transmit information completely independent of the other. Thus, an optical communication signal can be separated into two independent signal components, each of which is modulated onto a respective orthogonal polarization of a carrier signal prior to transmission. The receiver receives the two independently modulated signal components together, and is able to decipher, or decode, the components of the original signal, because the receiver knows the original polarization states of the signal components. The polarization state of the data encoded on the communications signal can be varied according to a pre-determined, pseudo-random pattern, as shown in Plot (b), which shows the data being modulated on two polarization states of the carrier signal: $P_1$ and $P_2$.

A polarization multiplexing technique, such as the one shown in Plot (b) for example, allows for added security, because eavesdroppers attempting to intercept communications multiplexed in such a manner are unable to distinguish the separately modulated polarization states without knowing the original polarization states of the signal components and without knowing the pre-determined pattern of the polarization change sequence.

Polarization multiplexing can be used in combination with one or more of the other encoding techniques to form a part of a multi-dimensional encoding technique in accordance with embodiments of the invention. For example, the polarization multiplexing shown in Plot (b) of FIG. 4 can be used in connection with a multi-wavelength control technique as shown in Plot (a) to create a multi-dimensional encoding whereby both the transmitted frequency of the carrier signal and the multiplexing of components of the communications signal on independent polarizations of a single carrier signal are independently varied according to independent pseudo-random patterns.

Multi-dimensional encoding techniques according to embodiments of the invention may make use of phase encoding, such as the phase encoding shown in Plot (c) of FIG. 4, or other phase encoding techniques, including phase-shift keying (PSK), and the like. In systems using coherent optical communications signals and coherent detection at a receiver, a transmitter can modulate the phase of the carrier communications signal in a predetermined manner to add an additional dimension of security. An example of changing the phase of a carrier signal according to a predetermined, pseudo-random pattern is shown in Plot (c) of FIG. 4, where the phase of the carrier signal is varied among multiple phases $\phi_i$. Although the example shown in Plot (c) shows the carrier signal being varied between four phases, more or fewer phases could be used depending upon the desired application and any design requirements.

According to some embodiments of the invention, quadrature phase-shift keying (QPSK), which makes use of four individual constellations for modulation (i.e., $\phi_1=45°$, $\phi_2=135°$, $\phi_3=225°$, $\phi_4=315°$), can be used to encode dual bit information. In such a QPSK system, the lookup tables associated with the two sets of bits can also be shuffled whenever a new key is sent to add an additional security layer. This shuffling can be performed in accordance with a predetermined pattern, which may be known by a friendly receiver, to allow the friendly receiver to properly decode the QPSK encoded signal, or could be determined in real-time.

Phase encoding can be used in combination with one or more other encoding techniques to provide a multi-dimensional encoding technique according to various embodiments of the invention. For example, phase encoding could be used in combination with frequency encoding, polarization state encoding, or both to produce a multi-dimensional encoding. Likewise, phase encoding, like any of the encoding techniques previously described, could be combined with other encoding techniques (not shown in FIG. 4 and not described herein) to form a multi-dimensional encoding technique according to embodiments of the invention.

One example of a multi-dimensional encoding technique that makes use of all of the encoding techniques shown in Plots (a)-(c) of FIG. 4 is shown in Plot (d). In Plot (d), a carrier signal is encoded according to three independent encoding techniques: frequency encoding, polarization state encoding, and phase encoding. Each of the encoding techniques that contributes to the multi-dimensional encoding is independently varied according to an independent pseudo-random pattern. Thus, the frequency is varied as shown in Plot (a), while at the same time the polarization and phase are independently varied as shown in Plots (b) and (c), respectively.

Although the multi-dimensional encoding shown in Plot (d) of FIG. 4 uses the encoding techniques from Plots (a)-(c), multi-dimensional encoding techniques according to other embodiments of the invention can make use of more or fewer contributing encoding techniques. For example, a combination of any two encoding techniques from Plots (a)-(c) could form suitable multi-dimensional encoding according to embodiments of the invention.

Additionally, encoding techniques not shown in FIG. 4 or described herein could be used as contributing encoding techniques to a multi-dimensional encoding technique according to embodiments of the invention. For example, a parameter, such as frequency or wavelength of the carrier signal, could be varied chaotically. In such an embodiment, frequency hopping could be executed using a chaotic algorithm or attractor known by an intended recipient to alter the frequency of the carrier signal. For example, a variety of possible chaotic algorithms could be known ahead of time, and control information indicating which of the chaotic algorithms is about to be used, along with an initial value could be transmitted to the intended recipient. Using such a technique, any one of a number of characteristics of the light could be varied chaotically, and would appear to change randomly to unauthorized viewers, but could be readily decoded by the intended receiver.

Figure 5:
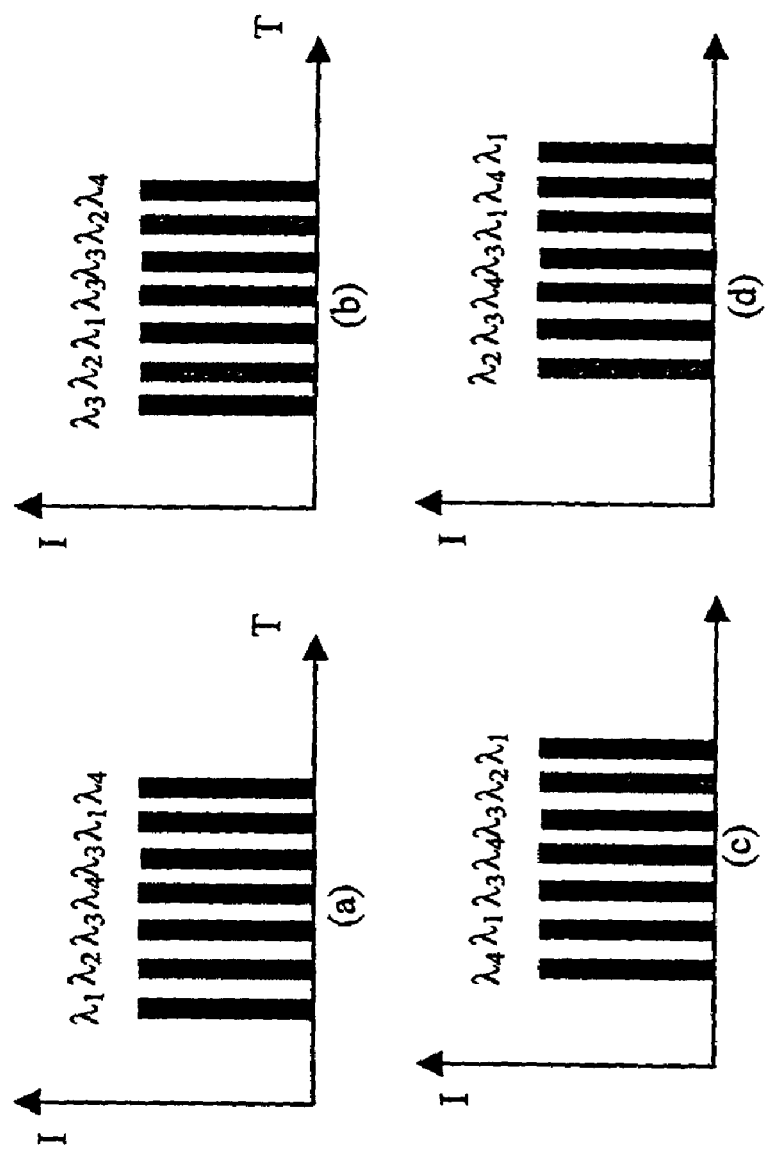
FIG. 5 illustrates a series of plots showing different examples of wavelength pseudo-random patterns for multi-dimensional encoding techniques, according to one or more embodiments of the invention.

As mentioned above, the various parameters of the transmitting signal, which are changed according to encoding techniques used in accordance with embodiments of the invention, are changed according to pre-determined pseudo-random patterns. One example of such pseudo-random patterns, which is described in greater detail below in connection with FIG. 5, is used for varying the frequency of a carrier signal to accomplish frequency (or wavelength) encoding. It should be recognized, however, that the principles discussed in connection with varying frequency (or wavelength) according to a pseudo-random pattern can also apply to other encoding techniques, such as polarization and phase encoding, and the like.

Plot (a) of FIG. 4 shows an example of varying frequency (or wavelength) according to a predetermined, pseudo-random pattern. Such a pseudo-random pattern can be, for example, defined using a pool of hundreds of wavelengths across a transmission band. The plots of FIG. 5 illustrate various examples of wavelength (or frequency) pre-determined, pseudo-random patterns that can be used in a multi-wavelength control technique, which as discussed above, can form a part of a multi-dimensional encoding technique according to various embodiments of the invention.

The number of wavelengths shown in Plots (a)-(d) of FIG. 5 is limited due to space constraints; however, any number of different wavelengths can be substituted for the pseudo-random patterns shown, and can be used in a multi-wavelength control technique, which may be used to form part of a multi-dimensional encoding technique according to embodiments of the invention. At the end of pseudo-random pattern, the sequence can resume again, starting from the first element of the same pseudo-random pattern. According to embodiments of the invention, the pseudo-random pattern can be changed from the previous pseudo-random pattern, rather than repeating patterns, to provide an additional security layer.

Plot (a) of FIG. 5 shows an initial wavelength pre-determined pseudo-random pattern. This wavelength pattern represents a series of wavelengths to be transmitted as a communications signal, whose wavelength is to be varied according to the pattern shown; from a transmitter to a receiver. Plots (b), (c), and (d) in FIG. 5 show other various pseudo-random patterns that can follow the initial pseudo-random pattern shown in Plot (a), according to different switching algorithms used in the multi-wavelength control technique. The switching algorithms will be discussed below in greater detail.

Plot (b) of FIG. 5 represents a pseudo-random pattern that is unrelated to the initial pseudo-random pattern shown in Plot (a). Using the switching algorithm that produced the wavelength pattern shown in Plot (b), a number of independent, unrelated, pseudo-random patterns can be created sequentially, and may provide an additional level of security because of the apparent high level of randomness in the transmission sequence.

Plot (c) of FIG. 5 represents a pseudo-random pattern of wavelengths that is reversed from the original (i.e., the initial pattern shown in Plot (a)). Thus, if the sequence shown in Plot (a) is an original pseudo-random pattern, Plot (c) illustrates the reverse of this original pseudo-random pattern, and immediately follows the pseudo-random pattern shown in Plot (a). The switching algorithm that produces the pattern of Plot (c) is based upon the previous pattern, and is, therefore, inherently less random than the switching algorithm used to create the pattern of Plot (b). The switching algorithm of Plot (c), however, is suitable for many applications, and may even be preferred for some uses.

Plot (d) of FIG. 5 represents a shifted pseudo-random pattern, which shifts the sequence of wavelengths in the initial pattern shown in Plot (a) by one position to the left. Switching algorithms similar to the algorithm used to create the wavelength pattern of Plot (d) can be used to shift the position of wavelengths in a particular pattern by any number of shifted positions from the original sequence. The switching algorithm used to generate the sequence shown in Plot (d) is inherently less random than the switching algorithm used to create the pattern of Plot (b), as it is based upon the prior sequence. The switching algorithm of Plot (d), however, is suitable for many applications, and may even be preferred for some uses.

Plots (a)-(d) only represent a number of examples of pseudo-random patterns for use with frequency (or wavelength) encoding. In addition to the exemplary pseudo-random patterns shown in Plots (a)-(d) of FIG. 5, any number of pseudo-random patterns can be used in accordance with various embodiments of the invention. Moreover, the pseudo-random patterns shown in Plots (a)-(d) of FIG. 5, as well as any other suitable pseudo-random patterns, can be used with other types of encoding used in a multi-dimensional encoding technique according to one or more embodiments of the invention. Thus, similar pseudo-random patterns can be introduced into polarization state encoding, phase encoding, or any other encoding technique used in a multi-dimensional encoding schema according to embodiments of the invention.

Figure 6:
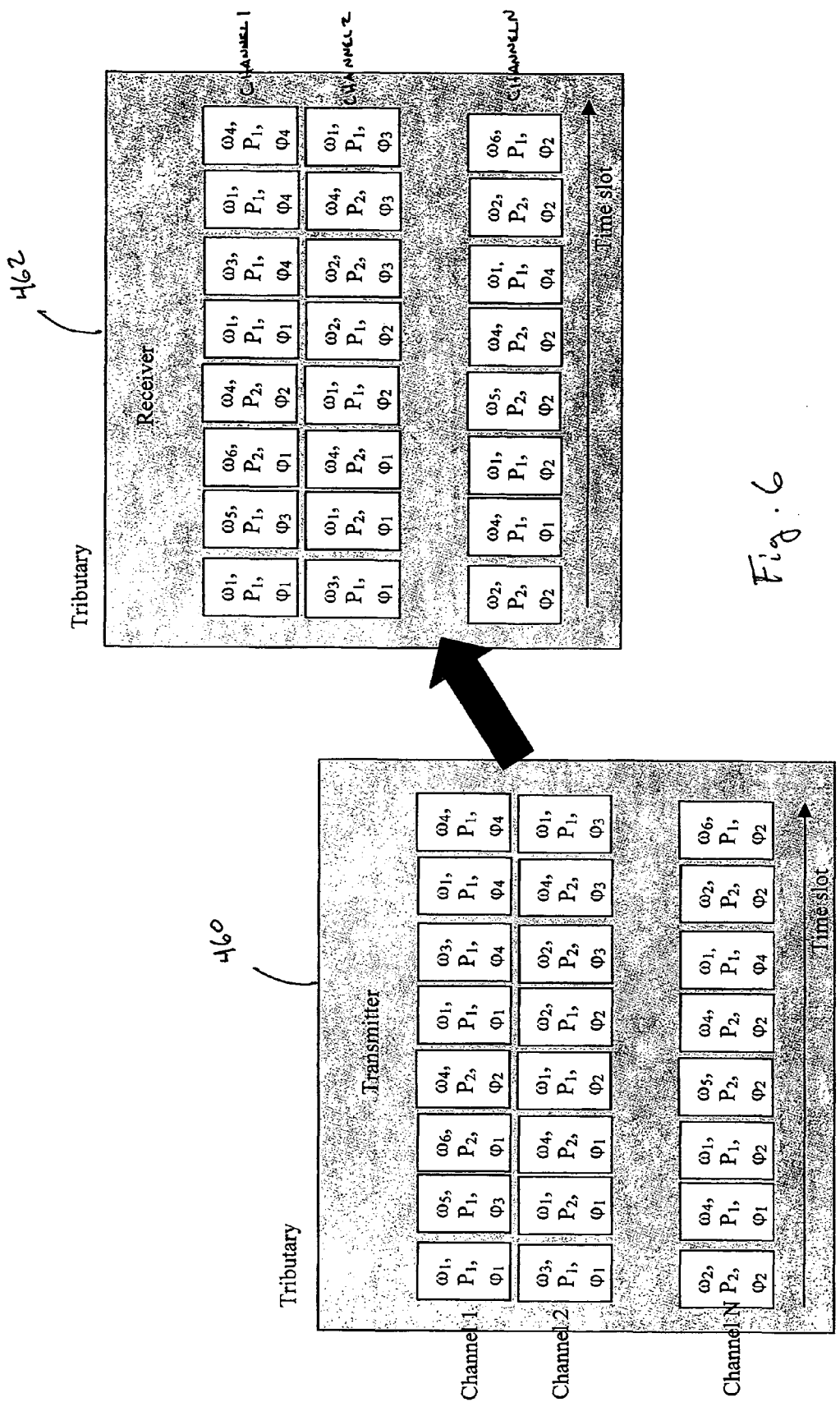
FIG. 6 illustrates an exemplary multiple channel communications link using a multi-dimensional encoding technique, according to one or more embodiments of the invention.

According to embodiments of the invention, one or more communications channels can be used to communicate signals encoded using to a multi-dimensional encoding technique according to embodiments of the invention. For example, as shown in FIG. 6, multiple channels that are each encoded using multi-dimensional encoding technique may be simultaneously communicated from a transmitter 460 to a receiver 462. According to embodiments of the invention, each terminal of the communication path (i.e., the transmitter 460 and the receiver 162) is referred to as a "tributary" of a communications system. The receiver 462 may use either homodyne or heterodyne detection.

In the exemplary system shown in FIG. 6, each of the encoded channels is encoded using a multi-dimensional encoding technique that encodes the communications signal using frequency encoding, polarization state encoding, and phase encoding. Thus, each channel has the cumulative security level of each of the encoding techniques, if used individually. Additionally, because the encoding of each channel is performed according to the three encoding techniques simultaneously, as part of a multi-dimensional encoding technique, there is a synergistic effect on the security of each of the channels. This is, in part, because without knowledge of what encoding techniques form a part of the multi-dimensional encoding technique used to encode the communications signal, it is extremely difficult to determine how the signal is encoded, and even more difficult to decode. Moreover, as mentioned above, an additional security layer may be added by increasing the apparent randomness of the pseudo-random pattern by which each of the channels is encoded. This may be carried out in such a way that each level of encoding has a different pseudo-random pattern, or by varying the pseudo-random pattern by which the signal is encoded.

Various switching algorithms can be used to notify a receiver 462 that the pseudo-random pattern to be transmitted is either being changed form or remains the same as an original pseudo-random pattern. This is applicable to all kinds of the pseudo-random patterns, including patterns used to encode wavelength, polarization, phase, and the like.

One example of the switching algorithm for indicating changes in pseudo-random patterns can use a control bit or other data bit to communicate such information. This control bit could be appended at the end of a sequence, or in a control portion of a packet, for example. Thus, the last transmitted data bit of "1" could be used to indicate that the following pattern or sequence about to be transmitted is the same as the pseudo-random pattern previously transmitted. In this exemplary system, a last transmitted data bit of "0", on the other hand, could be used to indicate that a pseudo-random pattern about to be transmitted has been changed from the original pseudo-random pattern.

Alternatively, more information could potentially be conveyed by way of a control bit. For example, according to embodiments of the invention, the last data bit of "0" could indicate that the pseudo-random pattern about to be transmitted has been reversed from the original pseudo-random pattern.

Another example of switching algorithm is related to a QPSK modulated signal transmission. For QPSK transmitted signal each symbol contains 2 bits of information, and therefore there are 4 various combinations of the last symbol: 01, 11, 10, and 00. Each unique combination is different from three other combinations and can be used to represent a certain type of the pseudo-random pattern switching. According to embodiments of the invention using QPSK, for example, this combination could indicate that the pseudo-random pattern about to be transmitted has been reversed from the original pseudo-random pattern, or shifted in some other pre-defined manner.

The foregoing examples of switching algorithms are intended to be exemplary only, and are not an exhaustive list of all of the possible switching algorithms that may be employed in the various embodiments of the invention. Indeed, any other suitable pseudo-random pattern switching algorithms could be used to notify a receiver of a pseudo-random pattern, or a change in such a pattern, about to be transmitted.

According to various embodiments of the invention the system can have a pre-defined sequence of pseudo-random patterns that are built into the receiver. While having such a pre-defined sequence of patterns would not provide the same kind of randomness and security afforded by changing patterns during communications, it may be sufficient and even desirable for some applications. For example, in applications where communications bandwidth or computing power at the receiving end must be minimized, a pre-defined sequence of patterns might be preferred.

According to other embodiments of the invention designed to further enhance the security level of the communications system, a multi-dimensional key distribution schema can be used to distribute an encoding key indicating the pattern of controlling and varying the various parameters of the data signal (e.g., transmitter wavelength or frequency, phase shift coding, polarization multiplexing, etc.). This key can, for example, be transmitted via a separate, secured channel. Many examples of such a separate, secured channel are known and would provide suitable security for transmitting a multi-dimensional key. For example, according to an embodiment of the invention, quantum encryption could be used to provide such a separate, secure channel for transmitting the multi-dimensional key. Alternatively, other forms of key transmission could be used in connection with other embodiments of the invention.

According to embodiments of the invention that make use of a separate, secure communications channel to transmit a multi-dimensional key, the multi-dimensional key can be continuously altered, thereby providing an additional security layer.

Figure 7:
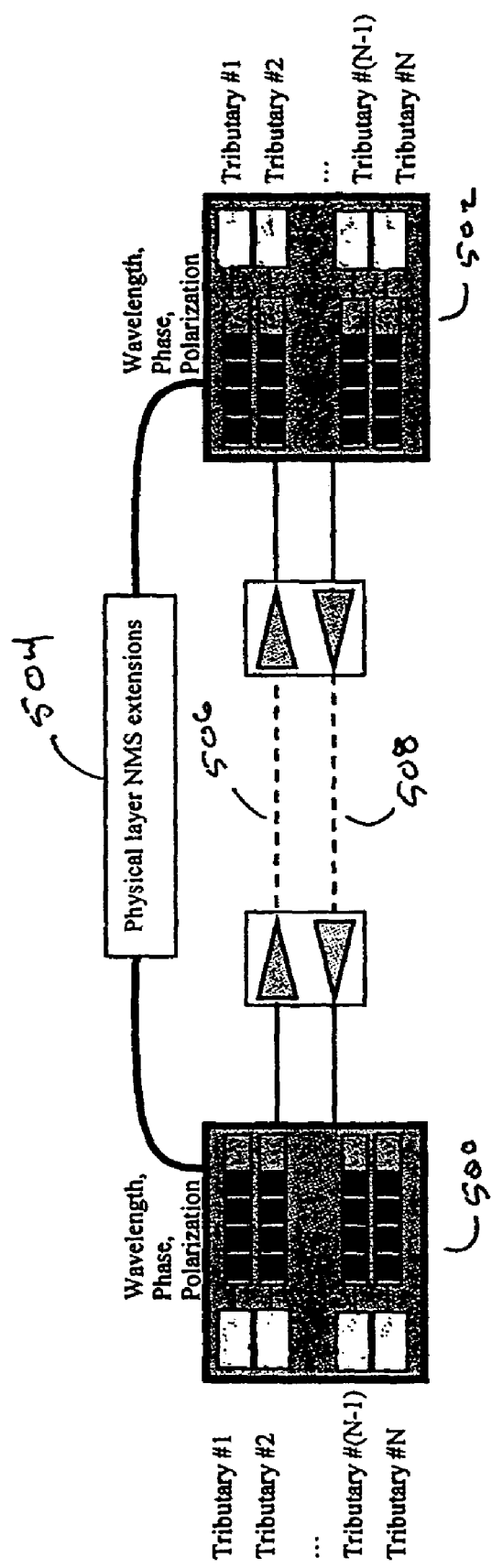
FIG. 7 illustrates a block diagram of a secured communication system, according to one or more embodiments of the invention.

Additional security can be provided, for example, by way of a network management system (NMS), such as the system shown in FIG. 7. The NMS includes software that distributes multi-dimensional keys to desired receivers, manages, encodes, and synchronizes the multi-dimensional key data, and/or monitors the operational integrity of the secure physical layer. In FIG. 7, two nodes 500, 502 provide communications terminals for multiple users, designated as individual tributaries of the nodes 500, 502. A physical layer NMS extensions link 504 is provided by which a multi-dimensional key can be passed to the nodes 500, 502 on the network. Using these multi-dimensional, encoding keys, the information from each of the tributaries of the various nodes 500, 502 is encoded, and may be communicated via the communications signals 506, 508. Either of the nodes 500, 502 can act as a transmitter, receiver, or both. Because of the multi-dimensional nature of the encoding between the nodes 500, 502, deciphering either of the communications signals 506, 508 between the nodes 500, 502 is extremely difficult. Moreover, it is even more difficult to discern the component of those communications signals 506, 508 that is independently attributable to any one of the individual tributaries of the nodes 500, 502.

When a communications signal 506, 508 is received at a node 500, 502, it is decoded using optical coherent detection (which according to some embodiments may preferably be digital detection), which mixes the received signal with that of a local optical oscillator. The mixed signal is then filtered using electronic data filtering. Additional electronic signal processing may be performed, to transfer the received signal to a base-band. The operating wavelength band of the NMS shown in FIG. 7, for example, may include the entire optical C-BAND (having a bandwidth of approximately 4.5 THz), where wavelengths can be spaced as closely as approximately 25 GHz. Data rates of approximately 10-40 Gbps and above can be obtained by way of such a system. Approximately 180 wavelengths operating simultaneously can be accommodated by way of such a system, which can transmit all of the wavelengths in a superimposed or multiplexed fashion, for example. Thus, approximately 180 tributaries at each of the nodes 500, 502 shown in FIG. 7 could make use of the system shown in FIG. 7 (i.e., accommodating 180 communications links). Accordingly, a unique and previously unattainable level of security in optical communications can be provided because approximately 180 encoded messages, each being encoded according to a multi-dimensional encoding technique, that are nearly indistinguishable to unauthorized data interceptors can be transmitted together as components of a single communications signal.

According to embodiments of the invention, the architecture of the NMS shown in FIG. 7 may make use of rapidly tuneable lasers, such as those described in U.S. application Ser. No. 10/173,581, incorporated by reference above, for transmitting a communications signal 506, 508. Additionally, the NMS shown in FIG. 7 may also use phase-coding modulators and tuneable filters at either of the nodes 500, 502, when used in their capacity as either receivers or transmitters.

According to other embodiments of the invention, the light sources described in copending U.S. application Ser. No. 10/173,579, incorporated by reference above, can be used to transmit a communications signal 506, 508. Similarly, any source of coherent light that generates a comb of frequencies, or which can be made to generate a comb of frequencies (e.g., by way of filtering, tuning, etc.) can be used to transmit a communications signal 506, 508.

According to other embodiments of the invention, a suitable coherent source for transmitting a communications signal 506, 508 can be a set of stabilized lasers with frequencies evenly spaced apart from one another. In such a multi-source system, instead of changing the wavelength of each laser during the sequential time slots, each laser could switch its radiation with particular frequency $\omega$, stable in time, from one channel to another. For example, FIG. 6 shows that the light with frequency $\omega_1$, is transmitted through different channels at different times, while light having other frequencies is similarly transmitted through different channels at different times. The light of each frequency could be from a single laser, which simply changes the channel on which it is transmitting at a given time. Thus, in FIG. 5, a laser that has a frequency $\omega_1$ would switch from channel to channel, changing channels in the following order: 1, 2, N, 2, 1, N, 1, and 2. Lasers transmitting light at other frequencies would similarly switch from channel to channel to transmit over the correct channel during the proper time slot.

Figure 8:
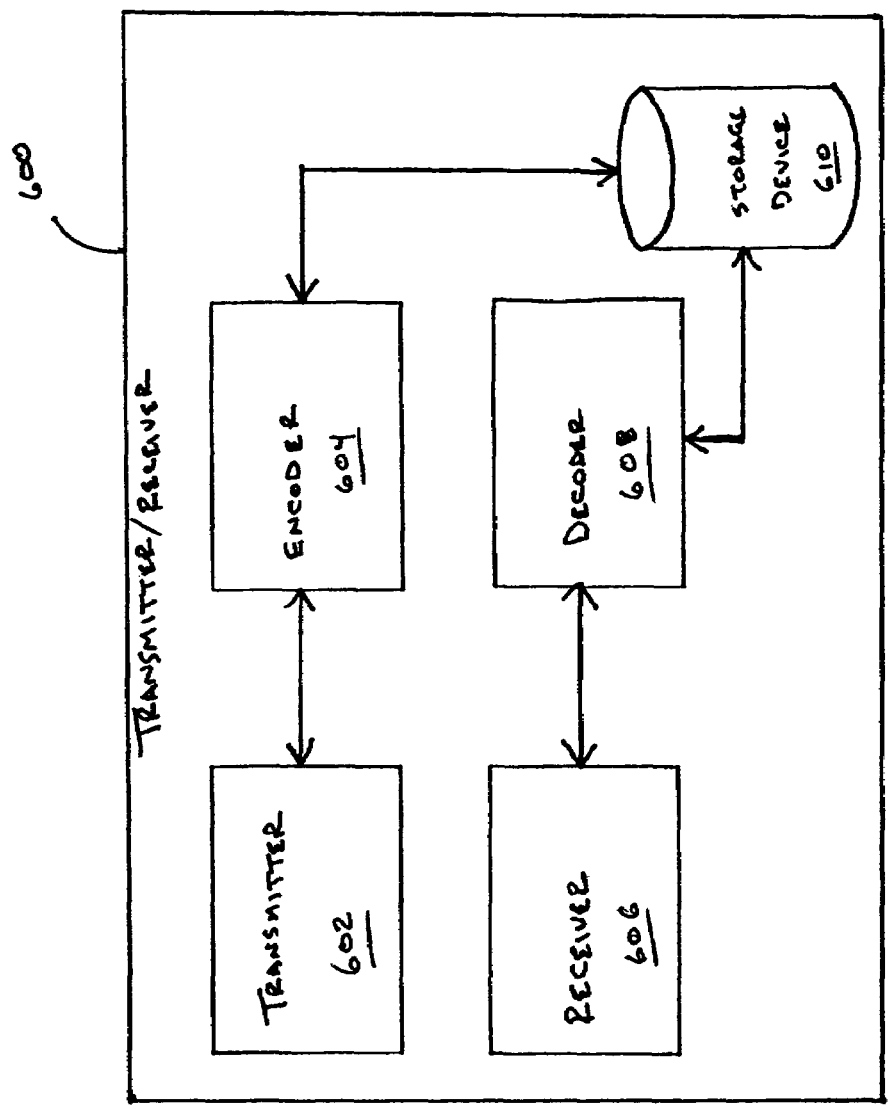
FIG. 8 shows a transmitter and/or a receiver device, according to one or more embodiments of the invention.

FIG. 8 shows a transmitter and/or a receiver device 600 in accordance with embodiments of the invention. The transmitter/receiver device 600 may be either a transmitter or a receiver, or may function as both (i.e., a transceiver), and various elements may be either included or omitted depending upon the desired functionality of the device. The transmitter/receiver may, for example, form part of the system shown in FIG. 7, as it may function as either of the nodes 500, 502 used to transmit and receive data in that figure.

The transmitter/receiver device 600 includes a transmitter 602, an encoder 604, a receiver 606, a decoder 608, and a storage device 610. According to embodiments of the invention, however, any one of the elements of the device 600 may be excluded. For example, the device 600 may serve exclusively to transmit; in which case, the transmitter 602, the encoder 604, and the storage device 610 would be used. Data to be communicated can be encoded by the encoder 604 using a multi-dimensional encoding technique, as described above. The encoded data is then provided to the transmitter 602, which transmits an encoded communications signal based on the encoded data received from the encoder 604. The encoder 604 may encode the data based upon a multi-dimensional encoding key stored within a storage device 610, which may be integral to or remote from the transmitter device 600.

The transmitter/receiver 600 may alternately serve as a receiving device. Specifically, the receiver 606 can receive an encoded communications signal and provide encoded data to the decoder. The decoder 608 then decodes the encoded data using a multi-dimensional decoding technique. The decoder 608 may decode the data using a multi-dimensional decoding key stored in a storage device 610, which can be integral to or remote from the receiver device 600.

The transmitter/receiver device 600 need not be limited, however, exclusively to either transmitting or receiving. For example, the device 600 may be used as a transceiver, both transmitting and receiving data encoded according to multi-dimensional encoding techniques. Additionally, although certain elements are shown as forming a part of the receiver 600, they may be optionally eliminated, or other elements may be added to the device 600 according to specific design parameters and desired functionalities of the device.

The multi-dimensional encoding techniques and systems described above provide advanced security, for example, by adding one or more additional security layers to communication signals in an optical communications system. These techniques and systems provide an extremely high level of security, as multiple security layers are superimposed upon one another, and may be dynamically varied and tailored according to the perceived or anticipated security of a communications link or links. Additionally, because of the relatively large spectral band over which these techniques can be used, it would require capabilities more advanced than those presently available to decipher the communications signals encoded thereby without having access to the multi-dimensional key. For example, in accordance with the embodiments of the invention that make use of the entire optical C-BAND, sampling rates of over 1 THz would be required to overcome the wideband interference level inherent in such communications signals. Moreover, the dynamic and multi-dimensional nature of the techniques described herein in addition to any data encryption techniques and/or user authentication techniques used in connection therewith, make it extremely difficult to decode a communications signal encoded by way of these techniques, even if the required high sampling rates were possible.

While the above invention has been described with reference to specific embodiments, these embodiments are intended to be illustrative and not restrictive. The scope of the invention is indicated by the claims below, and all changes that come within the meaning and range of equivalents thereof are intended to be embraced therein.

What is claimed is:

1. A method for secure communication, comprising:

encoding an optical communications signal based on a multi-dimensional encoding technique to produce a multi-dimensional encoded optical communications signal;

modulating the optical communications signal with data, transmitting the multi-dimensional encoded and modulated optical communications signal, coherently interfering the optical communications signal with a local oscillator optical signal, the local oscillator optical signal being encoded with any one code sequence from the multi-dimensional encoding technique and detecting the optical communications signal using a coherent optical detector, wherein the coherent interfering is between a particular code of the optical communications signal and the corresponding one code sequence of the local oscillator signal, wherein the encoding is independent from the modulating with data.

2. The method of claim 1, wherein the multidimensional encoding technique is based on changing of parameters of the transmission and the parameters include at least one of a phase of the optical communications signal, a polarization of the optical communications signal, and a frequency of the optical communications signal.

3. The method of claim 1, wherein the modulating with data is based on phase-shift keying (PSK) format.

4. The method of claim 1, wherein the modulating with data is based on amplitude-shift keying (ASK).

5. The method of claim 1, wherein the multi-dimensional encoding of the optical communications signal and the local oscillator signal are synchronized.

6. The method of claim 2, wherein the frequency of the optical communications signal is varied to one of a plurality of available frequencies as a function of time at discrete time intervals and the local oscillator signal is varied the same.

7. The method of claim 2, wherein the frequency of the optical communications signal is varied to one of a plurality of available frequencies, the carrier frequency being varied according to a pre-determined pattern as a function of time at discrete time intervals.

8. The method of claim 7, wherein a first portion of the discrete time intervals has a duration different from a duration of a second portion of the discrete time intervals.

9. The method of claim 2, wherein the frequency of the optical communications signal is varied to one of a plurality of available frequencies as a function of time at discrete time intervals, according to a pre-determined pattern, the method further comprising: selecting a first pre-determined pattern from a plurality of predetermined patterns for a first data set transmission to a recipient; providing information about the first pre-determined pattern to the coherent optical detector and decoding the encoded optical communications signal based on the first pre-determined pattern; selecting a second pre-determined pattern from plurality of pre-determined patterns for a second data set transmission to a recipient; providing information about the second pre-determined pattern to the coherent optical detector and decoding the encoded optical communications signal based on the second selected pre-determined pattern.

10. The method of claim 2, wherein the polarization of the optical communications signal is varied as a function of time and the local oscillator signal is varied as the same function of time.

11. The method of claim 2, wherein the polarization of the optical communications signal is varied as a function of time based upon a pre-determined pattern, the method further comprising: selecting the pre-determined pattern from a plurality of pre-determined patterns; providing information about the pre-determined pattern to the coherent optical detector and decoding the encoded optical communications signal based on the selected predetermined pattern.

12. The method of claim 2, wherein the phase of the optical communications signal is varied according to a pre-determined pattern, the method further comprising: selecting the pre-determined pattern from a plurality of predetermined patterns; providing information about the pre-determined pattern to the coherent optical detector and decoding the encoded optical communications signal based on the selected pre-determined pattern.

13. The method of claim 1, wherein the optical communications signal includes a plurality of optical communications signal components, each optical communications signal component from the plurality of optical communication signal components being uniquely associated with a communications channel from a plurality of communications channels, each the optical communications signal components from the plurality of optical communications signal components being encoded by the multi-dimensional encoding technique;
being transmitted over a communication link; and
being coherently interfered with a corresponding component of the local oscillator signal that includes a plurality of local oscillator signal components.

14. The method of claim 1, wherein the optical communications signal includes a plurality optical communications signal components, each optical communications signal component from the plurality of optical communications signal components being uniquely associated with a communications channel from a plurality of communications channels, each of the optical communications signal components from the plurality of optical communications signal components being encoded by the multi-dimensional encoding technique, the method further comprising:
decoding each of the encoded optical communications signal components of the encoded optical communications signal according to a multi-dimensional key associated with the multidimensional encoding technique by coherently interfering an optical signal component with a corresponding component of the local oscillator signal; the corresponding component of the local oscillator signal being encoded with the multi-dimensional key identical to the multi-dimensional key of the optical signal component.

15. The method of claim 1, wherein the multi-dimensional encoding technique is based on changing of parameters of the transmission and the parameters include at least two of: a phase of the optical communications signal; a polarization of the optical communications signal; and a frequency of the optical communications signal, wherein the frequency changes in at least KHz range.

16. An apparatus, comprising:
a light source, the light source generating a light beam;
an encoder configured to provide to the light source an encoding key for encoding the light beam using a multi-dimensional encoding technique,
a data modulator configured to modulate the light beam with data to be transmitted, the data modulator outputting an encoded optical communications signal;
a coherent optical receiver, the receiver coherently interfering the optical communications signal and a local oscillator signal;
the local oscillator signal being generated by a local oscillator, the local oscillator signal being encoded using the multi-dimensional encoding technique being identical to the multi-dimensional encoding technique applied to the light source; and
the apparatus configured to send and receive encoded optical communications signals based on the encoding key.

17. The apparatus of claim 16, wherein the multi-dimensional encoding technique uses at least one of: a phase coding; a polarization coding, and a frequency coding.

18. The apparatus of claim 16, wherein the local oscillator signal is synchronized with the optical communications signal.

* * * * *